O. E. HERSHEY.
SPRING SEAT.
APPLICATION FILED AUG. 11, 1919.

1,341,555.

Patented May 25, 1920.

WITNESS:
R. G. Thomas

INVENTOR.
BY O. E. Hershey
Victor J. Evans
ATTORNEY.

UNITED STATES PATENT OFFICE.

OMER E. HERSHEY, OF GAP, PENNSYLVANIA.

SPRING-SEAT.

1,341,555.     Specification of Letters Patent.     Patented May 25, 1920.

Application filed August 11, 1919. Serial No. 316,688.

*To all whom it may concern:*

Be it known that I, OMER E. HERSHEY, a citizen of the United States, residing at Gap, in the county of Lancaster and State of Pennsylvania, have invented new and useful Improvements in Spring-Seats, of which the following is a specification.

This invention relates to seats for farm implements and has for its object the provision of a spring suspended seat whereby the operator will be spared the shocks and jars incidental to the travel of the implement over rough or uneven ground so that he will be assured comfort.

An important object is the provision of a seat of this character in which the supporting frame is adjustable as to width and height.

An additional object is the provision of a seat of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawing in which—

Figure 1:
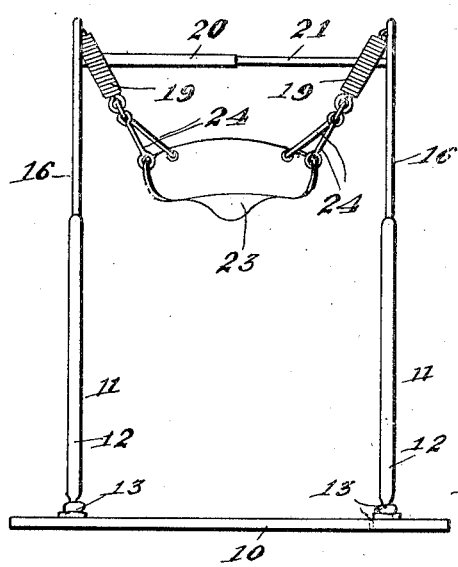
Figure 1 is a front elevation of a seat constructed in accordance with my invention.
Figure 2:
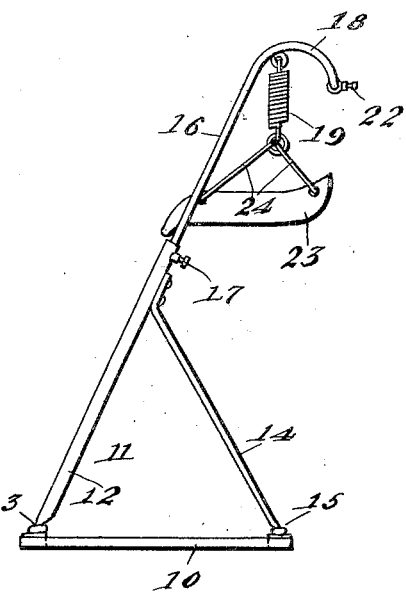
Fig. 2 is a side elevation thereof.
Figure 3:
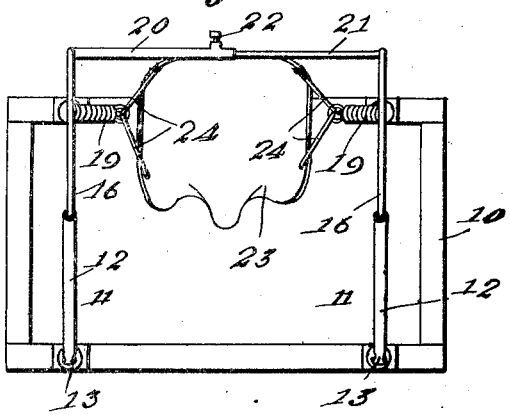
Fig. 3 is a plan view.

Referring more particularly to the drawings, the numeral 10 designates the base of the seat which is formed as an open rectangular frame adapted to be secured upon an agricultural implement. Disposed upon and extending upwardly from the base 10 are spaced side frames 11 which are inclined rearwardly and each of which includes a tubular portion 12 pivotally connected at its lower end, as shown at 13, with the base 10. Each tubular portion 12 is braced by a rod 14 which is secured to its upper portion and which is pivotally connected at its lower end, as shown at 15, with the base 10. Slidably engaged within each tubular portion 12 is an upper rod 16 which may be held in adjusted positions by means of a suitable set screw 17 extending through the tubular portion 12. At their upper extremities, the upper rods 16 are curved rearwardly, as shown at 18, and have connected therewith depending springs 19. The upper ends of the rods 16 are connected by means of a tubular member 20 secured to one rod 16 and a rod 21 secured to the other rod 16 and telescopically engaged within the tubular member 20. A suitable set screw 22 is provided for holding the rod 21 in adjusted positions within the member 20 so that the distance between the upper ends of the side frames 11 may be varied, the pivotal connections 13 and 15 permitting lateral swinging movement of the side frames.

The seat proper is designated by the numeral 23 and is of any suitable size and shape commonly used on agricultural implements. Connected with each side of the seat 23 at spaced points, are links 24 which converge upwardly and which are connected with the lower ends of the springs 19.

In the use of the device it will be seen that owing to the provision of the springs 19 an operator seated within the seat 23 may ride in comfort as the springs 19 will provide resilience and will therefore eliminate the sudden shocks and jars incident to the travel of agricultural implements over rough and uneven ground. Owing to the fact that the side frames are inclined rearwardly the width adjusting members 20 and 21 will not interfere with the back of the operator. As stated hereinbefore, the device may be adjusted as to width for properly supporting the seat proper and the frame may also be adjusted as to height whereby to comfortably accommodate operators of different statures.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A spring seat structure comprising a base frame, a pair of side frames rising from said base frame and pivotally connected therewith for swinging movement toward and away from each other, each side frame including a tubular member and a brace member, arms, adjustably telescopically engaged within said tubular members and having their upper ends rearwardly and downwardly curved, telescopically connected with members connected with the downturned ends of said arms, springs connected with said arms and depending therefrom, and a seat suspended from said springs.

In testimony whereof I affix my signature.

OMER E. HERSHEY.